Dec. 2, 1952 — F. E. OBERMAIER — 2,620,134
FLUID MIXING VALVE
Filed Aug. 16, 1950 — 3 Sheets-Sheet 1
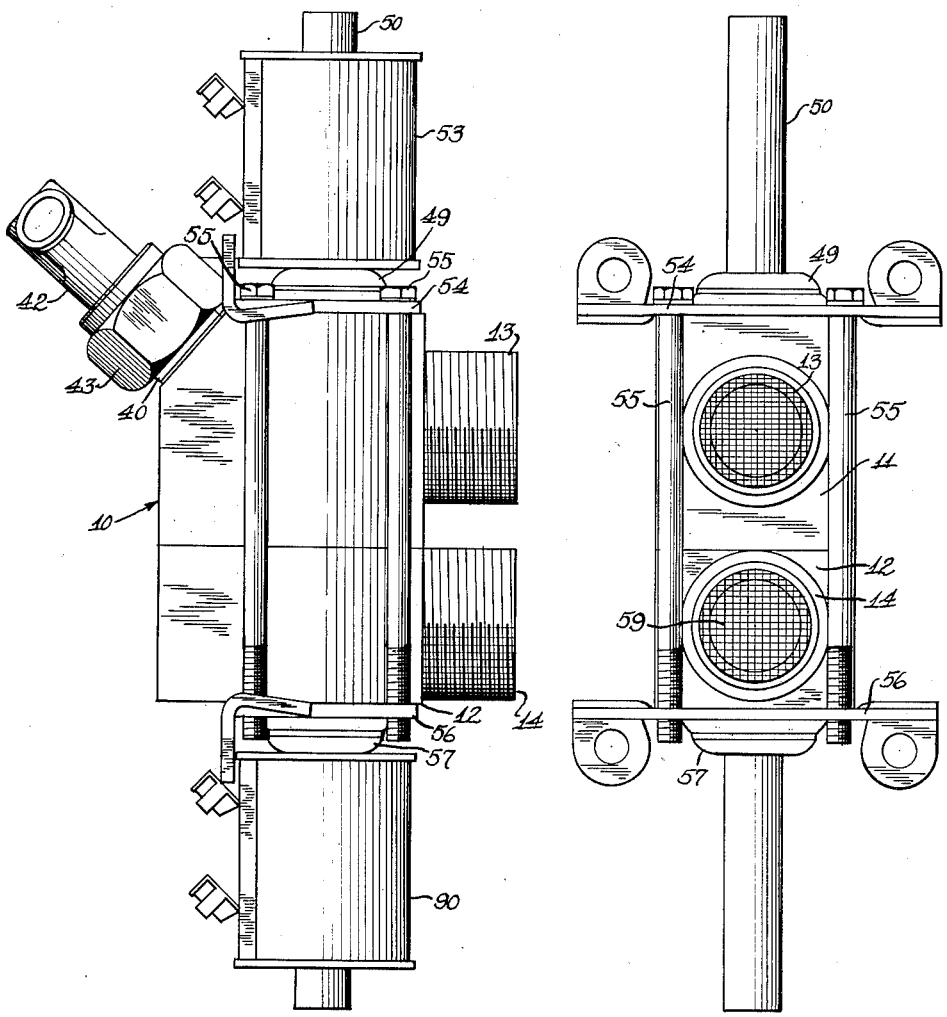
Inventor
Frank E. Obermaier Inventor
Frank E. Obermaier
by The firm of Charles W. Hills Attys

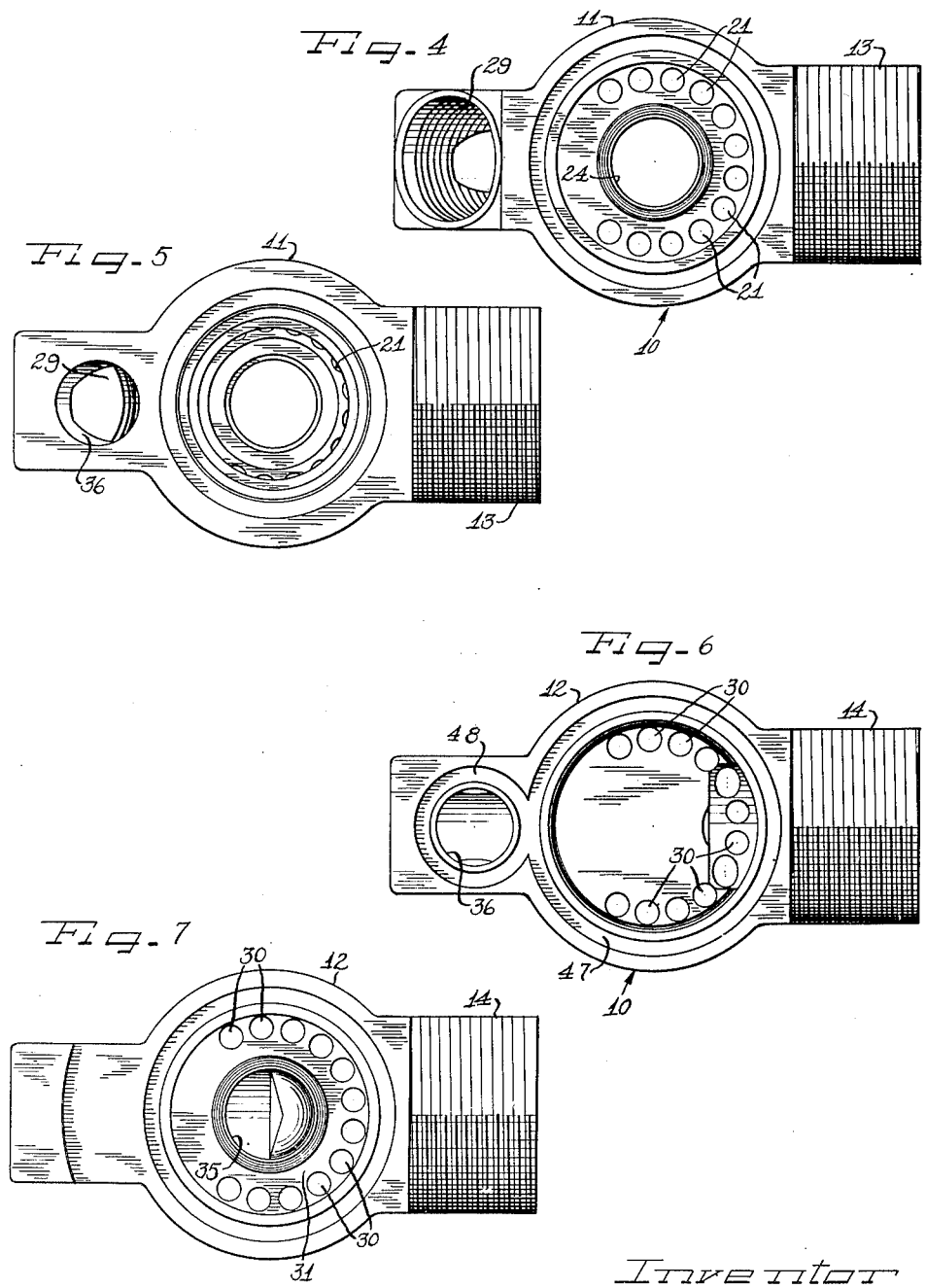

Patented Dec. 2, 1952

2,620,134

UNITED STATES PATENT OFFICE 2,620,134

FLUID MIXING VALVE

Frank E. Obermaier, Oak Park, Ill., assignor to The Dole Valve Company, Chicago, Ill., a corporation of Illinois Application August 16, 1950, Serial No. 179,810

13 Claims. (Cl. 236—12)

This invention relates to improvements in thermostatically controlled fluid mixing valves for mixing hot and cold fluids and delivering them at predetermined temperatures.

My invention has as one of its principal objects to provide a new and improved fluid mixing valve arranged with a view toward utmost simplicity in manufacture and operation.

Another object of my invention is to provide a fluid mixing valve arranged to have an upper temperature range at the temperature of the hot water and to have predetermined intermediate ranges which may be mixtures of the hot and cold water.

Still another object of my invention is to provide a novel and improved form of fluid mixing valve having a mixing chamber with thermostatically operated valve means therein controlling the mixture of the hot and cold water without altering the rate of flow through the valve, and having a hot water bypass around this chamber together with a uniform delivery orifice at the discharge end of the valve, delivering a uniform volume of water regardless of variations in pressure within the valve.

A still further object of my invention is to provide a novel form of valve construction so arranged as to simplify the manufacture of the valve by eliminating the need for inserts to form the passageways and seats of the valve.

Still another object of my invention is to provide a new and improved mixing valve including an open-ended valve body of a two-part construction wherein the valve seats and passageways are integral parts of the valve body.

A further object of my invention is to provide a new and improved valve construction for mixing hot and cold water and delivering water at a predetermined temperature wherein the valve mechanism is carried by a two-part valve body open at its ends, and wherein the means for maintaining the ends of the valve body fluid tight also serve to connect the parts of the valve body together.

A still further object of my invention is to provide a novel form of mixing valve for mixing hot and cold fluids wherein the hot and cold sides of the valve body are formed from two parts, each of which parts may have the respective fluid passageways, valve chambers and valve seats formed integrally therewith, and wherein the means for closing the ends of the valve body also forms the means for controlling the flow of fluid therethrough and for connecting the parts of the valve body together.

These and other objects of my invention will appear from time to time as the following specification proceeds and with reference to the accompanying drawings, wherein:

Figure 1 is a view in side elevation of a solenoid operated fluid mixing valve constructed in accordance with my invention;

Figure 2 is an end view of the valve shown in Figure 1 with the solenoid coils for controlling operation of the valve removed;

Figure 4 is a top plan view of the upper valve body with the valve parts removed;

Figure 5 is a bottom plan view of the upper valve body with the operative parts of the valve removed;

Figure 6 is a top plan view of the lower valve body; and

Figure 7 is a bottom plan view of the lower valve body.

Figure 3:
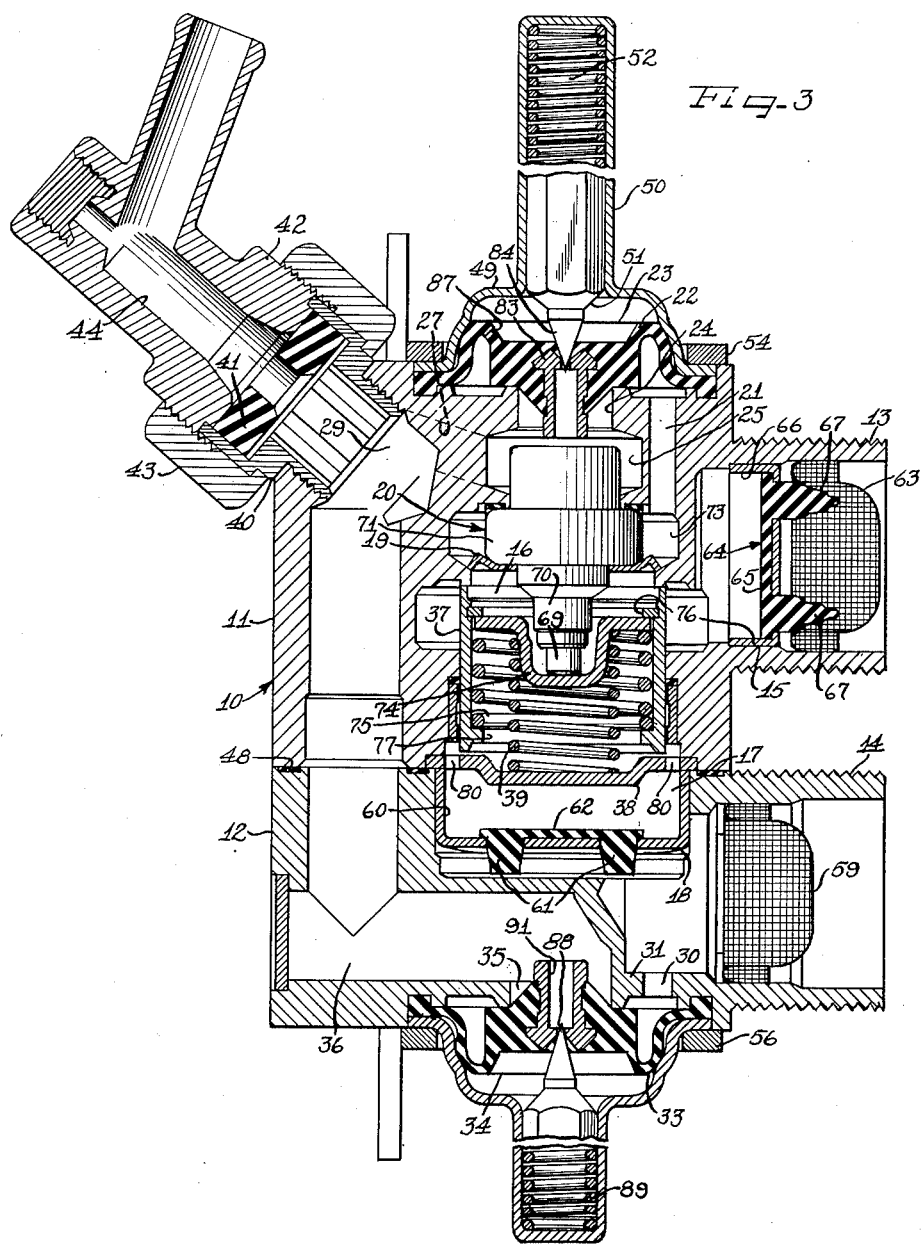
Figure 3 is a fragmentary transverse sectional view taken through the hot and cold water inlets of the valve shown in Figure 1, with the solenoid coils removed and parts of the valve plungers and guides therefor broken away.

In the embodiment of my invention illustrated in the drawings, the valve is shown as comprising a valve body 10 made up of two hollow body parts 11 and 12 connected together in aligned relation with respect to each other, the part 11 having a cold water inlet 13 leading thereinto and the part 12 having a hot water inlet 14 leading thereinto. The valve body parts 11 and 12 may be cast or molded from brass or bronze, but are preferably extruded from a brass bar into the general valve body shape desired, and are then drilled and machined as required.

The cold water inlet 13 communicates with an annular passageway 15 formed within the valve body and communicating with a mixing chamber 16 extending axially through the body part 11. The hot water inlet 14 communicates with a central chamber 17 in the body part 12 through a check valve 18 and in axial alignment with the mixing chamber 16, for supplying hot water to said mixing chamber for mixture with the cold water entering said chamber through the annular passageway 15. The mixed hot and cold water may pass from the mixing chamber 16 by an apertured saddle 19 for a temperature responsive element 20, through drilled passageways 21, 21 to the under side of a diaphragm 22 of a fluid-operated diaphragm valve 23. When the valve 23 is opened, fluid may pass through the central bore or passageway 24 into a chamber 25 encircling the base part of the casing of the temperature responsive element 20. Drilled passageways 27, 27 lead from said chamber to an outlet passageway 29. Packing is interposed between the temperature responsive element and the chamber 25 to prevent leakage of water by said element from the mixing chamber 16 to the chamber 25.

Hot water entering the valve body 10 through the inlet 14, besides flowing past the check valve 18 may also pass through drilled passageways 30, 30 formed in a wall portion 31 closing said inlet and the chamber 17. From said passageways 30, 30 the hot water may flow within the annular under surface of a fluid operated valve 33, herein shown as being a pressure operated diaphragm valve, including a diaphragm 34. When the valve 33 is opened, fluid may flow through a central bore or passageway 35 into a bypass chamber or passageway 36 to the outlet passage 29.

When the valve 33 is opened and the valve 23 is closed, hot water may be directly bypassed past the mixing chamber 16 through the outlet passageway 29 and supplied for use at substantially the temperature of the hot water at its source of supply.

When the valve 33 is closed and the valve 23 is opened, hot water may pass into the chamber 17 and mixing chamber 16 for mixture with the cold water therein under control of a sleeve valve 37 adapted to seat against an apertured retainer 38 at its lower end and operated by the temperature sensitive element 20 and a return spring 39. The mixed hot and cold water may then leave mixing chamber 16 through the drilled passageways 21, 21, the central passageway 24, the chamber 25, passageways 27, 27 and outlet 29.

When both valves 23 and 33 are opened, part of the hot water may pass by the check valve 18 within the chamber 16 for mixture with the cold water under control of the sleeve valve 36 and thermostat 20, while the balance of the hot water may pass through the valve 33 and the bypass passageway 36 to the outlet 29 for mixture with the mixed hot and cold water.

The outlet 29 of the valve is herein shown as having a constant rate of flow maintaining device carried therein, and including a coupling member 40 threaded within said outlet. The outer side of the coupling 40 has an enlarged drilled portion within which is relatively loosely mounted a deformable annulus 41. The annulus 41 abuts the end face of a coupling 42. The coupling member 42 abuts the outer end of the coupling 40 and is secured thereto as by a shouldered nut 43, the shouldered portion of which engages a corresponding recessed portion of the coupling 40. The coupling 42 has an internal passageway 44 terminating at its inner end into two frusto-conical surfaces diverging therefrom, the surface of greatest angularity being adjacent the deformable annulus 41.

The arrangement of the deformable annulus 41 and the frusto-conical surfaces of the outlet passageway 44 is such that as the head of the water in the outlet 29 increases, the annulus 41 will be deformed to extend within the frusto-conical surfaces of the passageway 40, causing a constriction of the upstream side of the passageway through the annulus and reducing the size of the orifice therethrough, thus providing a constant rate of fluid delivery from the outlet 29 irrespective of changes and fluctuations in pressure drop across the annulus 40.

The upper face of the body part 12 has two annular grooves 47 and 48 formed therein and herein shown as being connected together and encircling the chamber 17 and the bypass passageway 36 (see Figures 3 and 6). These grooves may form a seat for packing around said chamber and passageway, which may conveniently be in the form of a figure 8. The upper face of the body part 12 may be machined and the packing and upper face of said body part may be engaged by a machined bottom surface of the body part 11 and maintained in fluid-tight engagement therewith by the means which maintains the ends of the valve body closed, as will hereinafter more clearly appear as this specification proceeds.

The upper end of the central opening through the body part 11 is closed by the valve 23 and end closure member or cap piece 49 engaging and closing the top of said diaphragm and having a guide stem 50 extending upwardly from the central portion thereof. The diaphragm 22 is recessed at its periphery in the valve body and is engaged by the annular flanged portion of the cap piece 49, maintaining said diaphragm in engagement with said groove. The guide stem 50 is closed at its top and forms a guide for a plunger or armature 51 of the valve 23 and also has a spring 52 for said plunger carried therein and forms a support for a coil 53 for the solenoid, as may clearly be seen by reference to Figures 1 and 3. The cap piece 49 extends within a central counterbore of the end body part 11, into engagement with the annular outer portion of the diaphragm 22, and is held in engagement therewith by a yoke 54 encircling said cap piece and extending therefrom beyond the margins of the valve body. The bolts 55, 55 extend through the yoke 54 and are threaded within a yoke 56 at their lower ends. The yoke 56 engages a cap piece 57 for the valve 33 and closes the end of said valve. Said yokes and tie bolts thus maintain the cap pieces in fluid-tight engagement with the ends of the valve body, closing the ends thereof and holding the parts of the valve body together. Said yokes may also serve as a mounting means for mounting the valve on the device for which the water may be supplied.

A simplified and improved valve body structure has thus been provided, wherein the machining operations have been simplified and the usual inserts for the valve seats and fluid passageways have been eliminated by making the seats and valve body parts integral with the valve body, made possible by forming the valve body in two parts and connecting the parts together in leak-proof relation with respect to each other by the means which also serves to maintain the ends of the body parts closed and free from leakage.

Referring now in more detail to the mixing chamber structure and the control means for mixing the hot and cold fluids for discharge at predetermined temperatures, the inlet 14 of the hot body part 12 is herein shown as having a screen or strainer 59 of a generally cup-shaped formation mounted therein to prevent sediment, scale or dirt from entering the valve through the hot water inlet. The check valve 18 is also mounted in the chamber 17 to prevent the back flow of mixed or cold water into the hot water inlet.

The check valve 18 is herein shown as comprising a cup 60 having a perforated bottom, certain of the perforations of which may receive nibs 61, 61 extending from a flexible disk 62 on the inside of said cup and shown as abutting the bottom thereof. The disk 62 may be formed from rubber, "neoprene," or any like flexible material and flexes to permit hot water to enter through the apertured bottom portion of said cup from the inlet 14 and tightly engages the bottom of said cup upon back pressures within said cup, to block the back-flow of water into the inlet 14.

The cold water inlet 13 has a strainer 63 and a check valve 64 therein. Said check valve, like the check valve 18, is formed from a flexible disk 65 mounted in the apertured bottom of a cup or retainer 66 and retained therein by nibs 67, 67 extending through certain of the apertured portions of said retainer.

The temperature sensitive element 20 may be of the so-called power element type wherein a deformable medium (not shown) carried in the element casing acts against a membrane or deformable member (not shown) to extend a piston 69 from a cylinder 70.

The casing of the temperature-sensitive element is herein shown as being encircled by a ring 71 seated in the saddle 19 extending across an annular chamber 73 communicating with the mixing chamber 16 through said saddle and also communicating with the passageways 21, 21. The piston 69 engages a stirrup 74 slidably mounted in the valve sleeve 37. The stirrup 74 is seated on the inner return spring 39. A snap ring 76 abuts the top of the stirrup 74 to hold said stirrup within the valve sleeve 37. An outer overtravel spring 75 is seated at its lower end on an inwardly extending annular rib 77 of the valve sleeve 37 and engages the underside of the stirrup 74 at its upper end. Said spring is relatively stiff and only yields upon over-travel of the piston 69. The return spring 39 is shown as being seated at its lower end on the retainer 38, which may be pressed within a shouldered bottom part of the part 11 of the valve body 10, and is shown as abutting the top surface of the part 12 of said valve body when the valve body is assembled. Segmental fluid passages 80, 80 are provided in the retainer 38 in alignment with the inside of the cup 60 and on the outside of the valve sleeve 37. The stirrup 74 and saddle 19 are likewise of an open construction to permit the passage of fluid thereby.

When the hot water diaphragm valve 33 is closed and the cold water diaphragm valve 23 is opened, and the valve sleeve 37 is in the position shown in Figure 3, hot water will enter the inside of the valve sleeve 37 through the segmental passages 80, 80 and will pass by the stirrup 74 and saddle 19 into the chamber 73, and through the drilled passageways 21, 21. From thence fluid will pass through the central bore or passageway 24 into the chamber 25 around the base of the temperature-sensitive element 20 for discharge through the drilled passageways 27, 27.

In the position shown in Figure 3, cold water will enter the annular chamber 15 and will be blocked from mixing with the hot water by the valve sleeve 37 seated against an inwardly spaced engaging end face of the passageway 15. As however, the temperature of the hot water reaches a point sufficient to effect extension of the piston 69 from the cylinder 70, the valve sleeve 37 will move downwardly into position to engage the top surface of the retainer 38, forming a seat for said valve sleeve. Cold water may then pass by the upper edge of the valve sleeve 37 into the chamber 73 for discharge to the central bore 24 through the passageways 21—21 until the temperature of the water around the temperature-sensitive element 20 is reduced to an extent sufficient to permit the return spring 39 to retract the piston 69 within the cylinder 70, at which time hot water will enter the hollow interior of the valve sleeve 37, it being understood that during intermediate positions of the valve sleeve 37 hot water may be admitted past the lower end of said valve sleeve while cold water may be admitted past the upper end of said valve sleeve and the hot and cold water may mix as they pass upwardly through the passageways 21—21.

The fluid-operated diaphragm valves 23 and 33 are well known forms of fluid-operated solenoid controlled diaphragm valves and each is of the same construction so the valve 23 only need be described briefly herein. The diaphragm 22 has a central boss with a reduced end portion of a generally frusto-conical formation forming the valve face, which may be seated within the passageway or bore 24. Said diapragm is herein shown as being provided with a hollow central metal insert 83, forming a metal orifice or passageway through the center of said diaphragm. The plunger or armature 51 of the solenoid 53 has a reduced conical end portion 84 engageable with the orifice through the top of the diaphragm and the insert 83 to close said orifice. The diaphragm 22 is also provided with a bleeder opening 87 to allow water to pass from one side thereof to the other and equalize the pressure on both sides of said diaphragm when the central orifice is closed by the plunger 51. When this occurs, the valve will be closed by pressure on the top side of said diaphragm since the surface area exposed to fluid pressure on the top side of the diaphragm is greater than the surface area exposed to fluid pressure on the underside thereof. If, however, the solenoid 53 is energized to disengage the plunger 51 from the central orifice through the diaphragm, pressure on the top side of the diaphragm will be released through said central orifice while the pressure on the bottom side thereof will flex said diaphragm upwardly, unseating the valve and allowing fluid under pressure to pass through the central bore or passageway 24 into the annular chamber 25 surrounding the base or casing of the temperature-sensitive element 20.

In a like manner, the valve 33 is controlled by a plunger or armature 88 moved against a spring 89 by the energization of a solenoid 90 to open an orifice 91 through the center of the diaphragm 34 and effect opening of the valve.

Either or both of the valves 23 or 33 may thus be opened by energizing either or both of the solenoids 53 or 90 to permit hot water only to flow through the valve or to permit hot water to mix with the cold water and flow through the valve at a temperature determined by the temperature-sensitive element 20, and various degrees of temperatures may be attained under control of the temperature-sensitive element or under control of the valves 23 and 33, the maximum temperature being that of the hot water which may be by-passed directly through the valve 33.

It will be understood that modifications and variations may be effected without departing from the scope of the novel concepts of the present invention.

I claim as my invention:

1. A mixture valve for hot and cold water comprising an open-ended hollow valve body, an inner wall of which defines a mixing chamber, two spaced inlets into said body communicating with said chamber adjacent opposite ends thereof, an outlet from said chamber and body, an extensible temperature-sensitive element mounted in said chamber adjacent one end thereof, a valve in said chamber and operated by said temperature sensitive element and controlling the passage of fluid into said chamber from both of said inlets, a passageway from one of said inlets to one open end of said body, a passageway from said chamber to the other open end of said body, fluid pressure operated valve means at opposite ends of said body, closing the open ends of said body and controlling the passage of fluid through the valve, a by-pass passageway to said outlet, by-passing hot water past said mixing chamber and a constant volume flow control member in said outlet.

2. A mixing valve for hot and cold water comprising an open-ended valve body having a central chamber and open outer ends communicating with said chamber, two spaced inlets into said body communicating with said chamber, one leading to one end thereof and the other leading to an intermediate portion thereof, an outlet from said body, a temperature-sensitive element mounted in said chamber adjacent one end thereof, a valve operated thereby and controlling the passage of fluid into said chamber from either of said inlets, a passageway from one of said inlets to one open end of said valve body, a passageway from said chamber to the other open end of said valve body, fluid pressure operated valve means closing the open ends of said valve body and controlling the passage of fluid through the valve, a by-pass passageway through said valve body to said outlet from said inlet connected directly to the open end of said valve body and by-passing hot water past said chamber, and a constant volume flow control member in said outlet.

3. In a mixing valve, an open-ended two-part valve body, one part of which has a central interior wall defining a mixing chamber and the other part of which opens to said mixing chamber and to the outer end of the valve body, an inlet for water at one temperature leading into said one part and through the wall thereof into said mixing chamber, an outlet from said mixing chamber through the end thereof, an inlet to said other part communicating with said mixing chamber and with the open end of said other part, a by-pass passageway from the open end of said other part leading to the discharge through said one part and by-passing fluid past said mixing chamber, and means securing said parts together in leakproof relation with respect to each other.

4. In a mixing valve, an open-ended two-part valve body, one part of which has a central wall defining a mixing chamber and the other part of which is in axial alignment with said one part and opens to said chamber at one end of said part and is open at its opposite end, an inlet for water at one temperature leading into said one part and to said mixing chamber, an inlet for water at another temperature leading into said other part, a temperature-sensitive element extending within said mixing chamber, a valve operated thereby and blocking the passage of water from said inlet into said mixing chamber upon variations in temperature therein, a passageway from said one inlet to the open end of said one part, a passageway from said other inlet to the open end of said other part, a common discharge passageway from each of said parts leading from said one part and communicating with said last-named passage, fluid pressure operated valve elements closing the outer ends of said parts and controlling the flow of liquid to said discharge passageway, closure means engaging said valve elements and closing the ends of said parts, and means holding said closure means in engagement with said valve elements and securing said parts together in leakproof relation with respect to each other.

5. In a mixing valve for mixing hot and cold water and delivering hot water or water at an intermediate temperature, an elongated hollow valve body, a cold water inlet adjacent one end of said body, a hot water inlet adjacent the other end of said body, said body having an interior wall defining a mixing chamber, flow passageways from said hot water inlet to the outer end of said valve body, flow passageways from said mixing chamber to the opposite end of said valve body, diaphragm valve means surrounding said open outer ends of said body, cap means closing and engaging said diaphragm valve means and closing the open outer ends of said body, yokes engaging and maintaining said cap means in engagement with said diaphragm valve means, and threaded members connecting said yokes together and maintaining the open ends of said body closed and the parts of said body in connected leakproof relation with respect to each other.

6. In a mixing valve for mixing hot and cold water and delivering hot water or water at a tempered temperature, an elongated hollow valve body having an intermediate generally cylindrical wall portion, the interior of which defines a mixing chamber, and having open ends communicating with said mixing chamber, an outlet from said valve body communicating with one of the open ends thereof, a cold water inlet leading into said valve body and mixing chamber, a hot water inlet leading into said valve body and communicating with said mixing chamber and the other outer open end of said valve body, said valve body being of a two-part construction, one part of which contains said cold water inlet mixing chamber and discharge outlet and another part of which contains said hot water inlet, a by-pass passageway from the open end of said other part through said one part to said discharge outlet, by-passing hot water past said mixing chamber, valve means enclosing the open ends of said valve body, and means enclosing said valve means and maintaining the parts of the valve in connected relation with respect to each other.

7. In a device for mixing water at different temperatures and delivering water at various desired temperatures, a hollow valve body an inner wall portion of which defines a mixing chamber, said valve body comprising two parts connected in aligned relation with respect to each other, one part of which contains said mixing chamber, a cold water inlet thereinto, and a discharge outlet leading therefrom, and the other part of which contains a hot water inlet and a chamber communicating with said mixing chamber and also contains a passageway leading to the open end of said part and a by-pass passageway communicating therewith and bypassing said mixing chamber, a temperature sensitive element extending within said mixing chamber and including a cylinder having a piston extensible therefrom and a valve moved by said piston in position to block the passage of hot water into said chamber, spring means moving said valve against said piston into position to block the passage of cold water into said chamber, a retainer for said spring means on the end of said mixing chamber having fluid passageways therethrough and forming a seat for one end of said valve, an engaging connection between said other part and said retainer, and means for connecting said parts together and clamping said other part into engagement with said retainer.

8. In a device for mixing hot and cold water, an open-ended hollow valve body, an inner wall portion of which defines a mixing chamber, said valve body comprising two parts connected in aligned relation with respect to each other, one of said parts containing said mixing chamber, a discharge outlet therefrom, and an inlet to said mixing chamber, and the other of said parts containing a chamber communicating with said mixing chamber and a hot water inlet into said communicating chamber, and also containing a passageway to the open end of said valve and a by-pass passageway connected therewith and by-passing said mixing chamber, a temperature sensitive element extending within said mixing chamber and including a cylinder having a piston extensible therefrom, and a valve moved by said piston in position to block the passage of hot water into said chamber, spring means moving said valve against said piston into position to block the passage of cold water into said chamber, a retainer for said spring means on the end of said mixing chamber adjacent said other part, an engaging connection between said other part and said retainer, and means for connecting said parts together and clamping said retainer to one open end of said one part, comprising cap means at the ends of said parts and tie rod means extending along the outer sides of said parts and maintaining said cap means in engagement with said parts.

9. A fluid mixing valve having a longitudinally extending hollow body an inner wall portion of which defines a mixing chamber disposed intermediate the ends of said body and another inner wall portion of which defines a liquid distribution chamber in alignment with said mixing chamber and disposed adjacent one end of said body, an end wall portion for said valve body encircling said liquid distribution chamber, an inlet into said mixing chamber through a wall of said valve body, a passageway from said mixing chamber through said end wall portion to the end of said valve body, another inlet into an opposite end of said valve body and communicating with said mixing chamber, an end wall portion closing said other inlet to the end of said valve body, a fluid passageway through said end wall portion to the end of said valve body, fluid operated valves closing the ends of said body, and the seats for said valves being formed integrally with said valve body.

10. A two-part valve body comprising a hollow body part open to each end thereof, the open ends thereof communicating through the center of said valve body defining a mixing chamber, said body having an end wall open at its center and extending across said body and an integral valve seat encircling the open center of said end wall and having an inlet to said chamber and an outlet therefrom, another hollow body part abutting said first body part in communication therewith, having an inner wall communicating with the wall of said mixing chamber and defining a communicating chamber opening to said mixing chamber, a transverse end wall defining an inner end wall of said communicating chamber, a passage through said end wall from said inlet to the outer end of said other body part, a central opening into said wall, a bypass passageway leading therefrom and by-passing said communicating chamber, a valve seat encircling said opening and formed integrally with said wall, and means maintaining the open ends of said parts closed and connecting said parts together in communicating relation with respect to each other.

11. A mixing valve for hot and cold water comprising an open ended two part valve body having a central chamber and open outer ends communicating with said chamber, spaced hot and cold water inlets into said body communicating with said chamber, the hot water inlet leading to one end of said chamber and the cold water inlet leading to an intermediate portion of said chamber, an outlet from said body, a temperature sensitive element mounted in said chamber adjacent one end thereof, a valve operated thereby and controlling the passage of fluid into said chamber from either of said inlets, a passageway from said hot water inlet to one open end of said valve body, a passageway from said chamber to the other open end of said valve body, fluid pressure operated valve means closing the open ends of said valve body and controlling the passage of fluid through the valve, a by-pass passageway through said valve body from said hot water inlet, and connected directly to one open end of said valve body and by-passing hot water past said chamber.

12. A two part valve body comprising a hollow body part open to each end thereof, the open ends thereof communicating through the center of said valve body and the center of said valve body having an interior wall portion defining a mixing chamber, said body having an end wall open at its center and extending across said body and a valve seat encircling the open center of said end wall, an inlet to said chamber through said valve body, and an outlet therefrom through said end wall, another hollow body part abutting said first body part and communicating therewith, said other body part having an inner wall communicating with the wall of said mixing chamber and defining a communicating chamber opening to said mixing chamber, a transverse end wall defining an inner end wall of said communicating chamber, a passage through said end wall from said inlet to the outer end of said other body part, a central opening into said wall, a by-pass passageway leading from said central opening and by-passing said communicating chamber, a valve seat encircling said central opening, and means maintaining the open ends of said parts closed and connecting said parts together in communicating relation with respect to each other.

13. A fluid mixing valve having a longitudinally extending hollow two part body part, an inner wall portion of which defines a mixing chamber disposed intermediate the ends of said body part and another inner wall portion which defines a liquid distribution chamber in alignment with said mixing chamber and disposed adjacent one end of said body part, an end wall portion for said valve body defining an end of said liquid distribution chamber and opening thereinto, an inlet into said mixing chamber through a wall of said valve body, a passageway from said mixing chamber through said end wall portion to the end of said valve body, another inlet into an opposite end of said valve body and communicating with said mixing chamber, another end wall portion enclosing said other inlet to the end of said valve body, a fluid passageway through said end wall portion to the end of said valve body, fluid operated valves closing the ends of said valve body, and seats for said valves on the outer ends of said end wall portions.

FRANK E. OBERMAIER.

REFERENCES CITED

The following references are of record in the file of this patent:

UNITED STATES PATENTS

| Number | Name | Date |
|---|---|---|
| 1,716,183 | Possons | June 4, 1929 |
| 1,962,214 | Russell et al. | June 12, 1934 |
| 2,308,408 | Wall | Jan. 12, 1943 |
| 2,449,766 | Brown | Sept. 21, 1948 |
| 2,453,409 | Chace | Nov. 9, 1948 |

FOREIGN PATENTS

| Number | Country | Date |
|---|---|---|
| 233,250 | Switzerland | of 1944 |